US006488286B2

(12) United States Patent
Yaksich

(10) Patent No.: US 6,488,286 B2
(45) Date of Patent: Dec. 3, 2002

(54) CHUCK AND POWER DRIVER HAVING IMPROVED INTERFACE ASSEMBLY

(76) Inventor: Theodore G. Yaksich, The Jacobs Chuck Manufacturing Company P.O. Box 592, Clemson, SC (US) 29633

(*) Notice: Subject to any disclaimer, the term of this patent is extended or adjusted under 35 U.S.C. 154(b) by 0 days.

(21) Appl. No.: 09/841,952

(22) Filed: Apr. 25, 2001

(65) Prior Publication Data

US 2002/0020972 A1 Feb. 21, 2002

Related U.S. Application Data

(60) Provisional application No. 60/226,631, filed on Aug. 21, 2000, and provisional application No. 60/226,632, filed on Aug. 21, 2000.

(51) Int. Cl.[7] .............................................. B23B 31/12
(52) U.S. Cl. ............................ 279/62; 279/62; 408/240
(58) Field of Search .......................... 279/62, 902, 150, 279/84, 97; 408/240; 285/404; 403/378, 379.1

(56) References Cited

U.S. PATENT DOCUMENTS

| | | | | | |
|---|---|---|---|---|---|
| 2,844,378 | A | * | 7/1958 | Whistler et al. | 279/97 |
| 3,390,897 | A | * | 7/1968 | Moore | 285/404 |
| 4,395,170 | A | * | 7/1983 | Clarey | 279/62 |
| 4,489,525 | A | | 12/1984 | Heck | |
| 4,962,681 | A | | 10/1990 | Yang | |
| 4,976,173 | A | | 12/1990 | Yang | |
| 5,011,343 | A | * | 4/1991 | Saban et al. | 408/240 |
| 5,033,552 | A | | 7/1991 | Hu | |
| 5,170,851 | A | | 12/1992 | Kress et al. | |
| 5,451,127 | A | | 9/1995 | Chung | |
| 5,531,278 | A | | 7/1996 | Lin | |
| 5,550,416 | A | | 8/1996 | Fanchang et al. | |
| 5,624,000 | A | | 4/1997 | Miller | |
| 5,738,469 | A | | 4/1998 | Hsu | |
| 5,882,153 | A | | 3/1999 | Mack et al. | |
| 5,927,914 | A | | 7/1999 | Mack et al. | |
| 5,988,653 | A | * | 11/1999 | Kuo | 279/62 |
| 6,047,971 | A | | 4/2000 | Harman, Jr. et al. | |
| 6,070,675 | A | | 6/2000 | Mayer et al. | |
| 6,079,716 | A | | 6/2000 | Harman, Jr. et al. | |
| 6,170,579 | B1 | | 1/2001 | Wadge | |
| 6,173,972 | B1 | * | 1/2001 | Temple-Wilson et al. | 279/62 |
| 6,247,706 | B1 | * | 6/2001 | Kuo | 279/62 |
| 6,257,596 | B1 | * | 7/2001 | Yang | 279/62 |

* cited by examiner

*Primary Examiner*—Steven C. Bishop
(74) *Attorney, Agent, or Firm*—Nelson Mullins Riley & Scarborough, LLP

(57) ABSTRACT

A chuck assembly for use with a power driver having a forward end, a housing, a gearbox, and a rotating spindle extending therefrom includes a separate interface plate. The interface plate is received by and is rotationally fixed to the forward end and includes a forward face defining a center opening and a forward-facing rotational stop. The spindle extends through the center opening to receive a chuck. The chuck includes a body having a nose and a tail, the tail being configured to rotate with the spindle, and the nose including an axial bore. Chuck jaws are received by the body and movable toward and away from the chuck axis. A bracket is disposed about the body and extends rearward of the tail. The bracket defines a rearward surface engaging the stop to rotationally fix the bracket to the interface plate.

20 Claims, 7 Drawing Sheets

CHUCK AND POWER DRIVER HAVING IMPROVED INTERFACE ASSEMBLY

This application claims priority to U.S. Provisional Patent Application Serial Nos. 60/226,631 and 60/226,632, each of which was filed on Aug. 21, 2000, and the entire disclosure of each of which is incorporated by reference herein.

BACKGROUND OF THE INVENTION

The present invention relates generally to electric or pneumatic power drivers.

Electric and pneumatic tool drivers are well known. Although twist drills are the most common tools on such drivers, the tools may also comprise screw drivers, nut drivers, burrs, mounted grinding stones and other cutting or abrading tools. Since the tool shanks may be of varying diameter or of polygonal cross section, the device is usually provided with a chuck that is adjustable over a relatively wide range. The chuck may be attached to the driver spindle by a threaded or tapered bore.

A variety of chucks for both hand and power drivers have been developed in the art. In one form of chuck, a chuck body includes three passageways disposed approximately 120 degrees apart from each other. The passageways are configured so that their center lines meet at a point along the chuck axis that is typically forward of the chuck. The passageways constrain three jaws which are moveable in the passageways to grip a cylindrical or polygonal tool shank displaced approximately along the chuck's center axis. The chuck includes a nut that rotates about the chuck center and that engages threads on the jaws so that rotation of the nut moves the jaws in either direction within the passageways. The body is attached to the spindle of a driver and is configured so that rotation of the body in one direction with respect to the nut forces the jaws into a gripping relationship with the tool shank, while rotation in the opposite direction releases the gripping relationship.

The chuck may be operated by a chuck key, by hand rotation of the sleeve in a keyless configuration, or by actuation of the driver motor. A keyless chuck may include a rear sleeve axially and rotationally held to the chuck body to permit an operator to rotationally hold the chuck body while rotating the chuck nut to open and close the chuck jaws. An example of a keyless chuck is disclosed in U.S. Pat. No. 5,501,473, which is commonly assigned and the entire disclosure of which is incorporated by reference herein.

Various configurations of keyless chucks are known in the art and are desirable in a variety of applications. For example, in one known form of a drill chuck, a rear sleeve is rotationally fixed to a spring-biased impact member that slides axially within the rear sleeve and that can selectively hold the nut against rotation with respect to the rear sleeve. Thus, when the drill spindle rotationally drives the chuck body, relative rotation between the body and the restrained nut drives the jaws toward an open or closed position.

To rotationally restrain the nut, however, the chuck also includes a mechanism to rotationally restrain the rear sleeve with respect to the drill housing. Specifically, a pair of screw heads extend forward from the front face of the drill on opposite sides of the drill spindle. A pair of legs that are rotationally fixed to, but axially movable with respect to, the rear sleeve extend rearwardly through the rear sleeve and receive the screw heads so that the screw heads rotationally hold the legs and the rear sleeve to the drill housing.

The legs are spring-biased rearwardly from the rear sleeve. As the drill spindle and the chuck body thread together, and therefore move axially toward each other, the front drill face pushes the legs forwardly into the chuck. The increased spring pressure increases the hold of the legs about the screw heads.

SUMMARY OF THE INVENTION

The present invention recognizes and addresses the foregoing considerations, and others, of prior art constructions and methods.

Accordingly, it is an object of the present invention to provide an improved chuck assembly and power driver.

It is also an object of the present invention to provide an improved interface between a chuck assembly and a power driver.

These and other objects are accomplished by providing a chuck assembly for use with a power driver having a forward end, a housing, a gearbox, and a rotating spindle extending therefrom that includes a separate interface plate. The interface plate is received by and is rotationally fixed to the forward end and includes a forward face defining a center opening and a forwardfacing rotational stop. The spindle extends through the center opening to receive a chuck. The chuck includes a body having a nose and a tail, the tail being configured to rotate with the spindle and the nose including an axial bore. Chuck jaws are received by the body and movable toward and away from the chuck axis. A bracket is disposed about the body and extends rearward of the tail. The bracket defines a rearward surface engaging the stop to rotationally fix the bracket to the interface plate.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1:
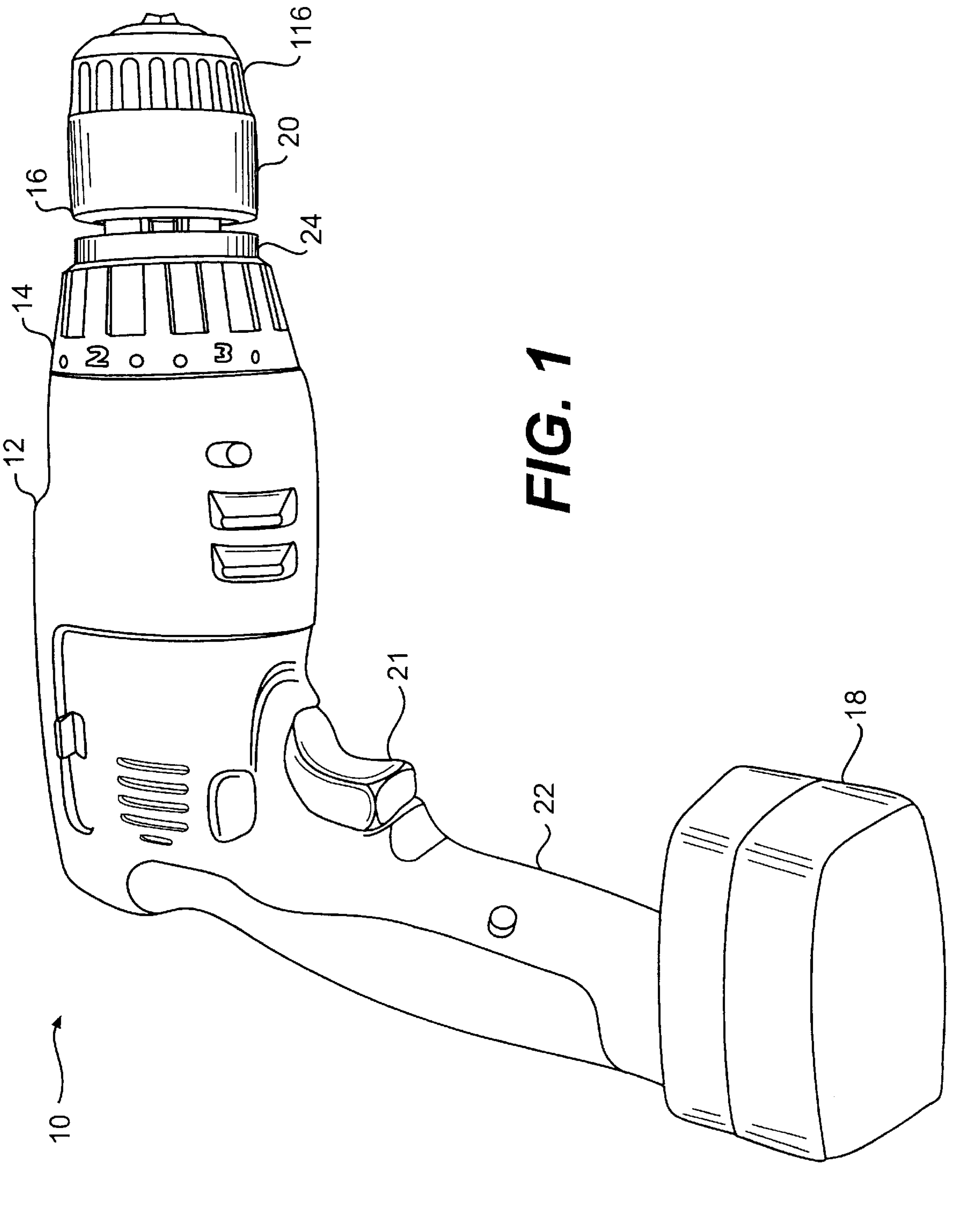
FIG. 1 is a perspective view of a power driver in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to FIG. 1, a power driver 10 in accordance with an embodiment of the present invention includes a housing 12, a clutch ring 14, a chuck assembly 16, and a battery pack 18. An actuation trigger 21 is defined in an upper portion of a power driver handle 22. Chuck assembly 16 includes a rear sleeve 20 and a front sleeve 116. As will be described in more detail, below, an interface ring or plate 24 is disposed between housing 12 and rear sleeve 20.

Figure 2:
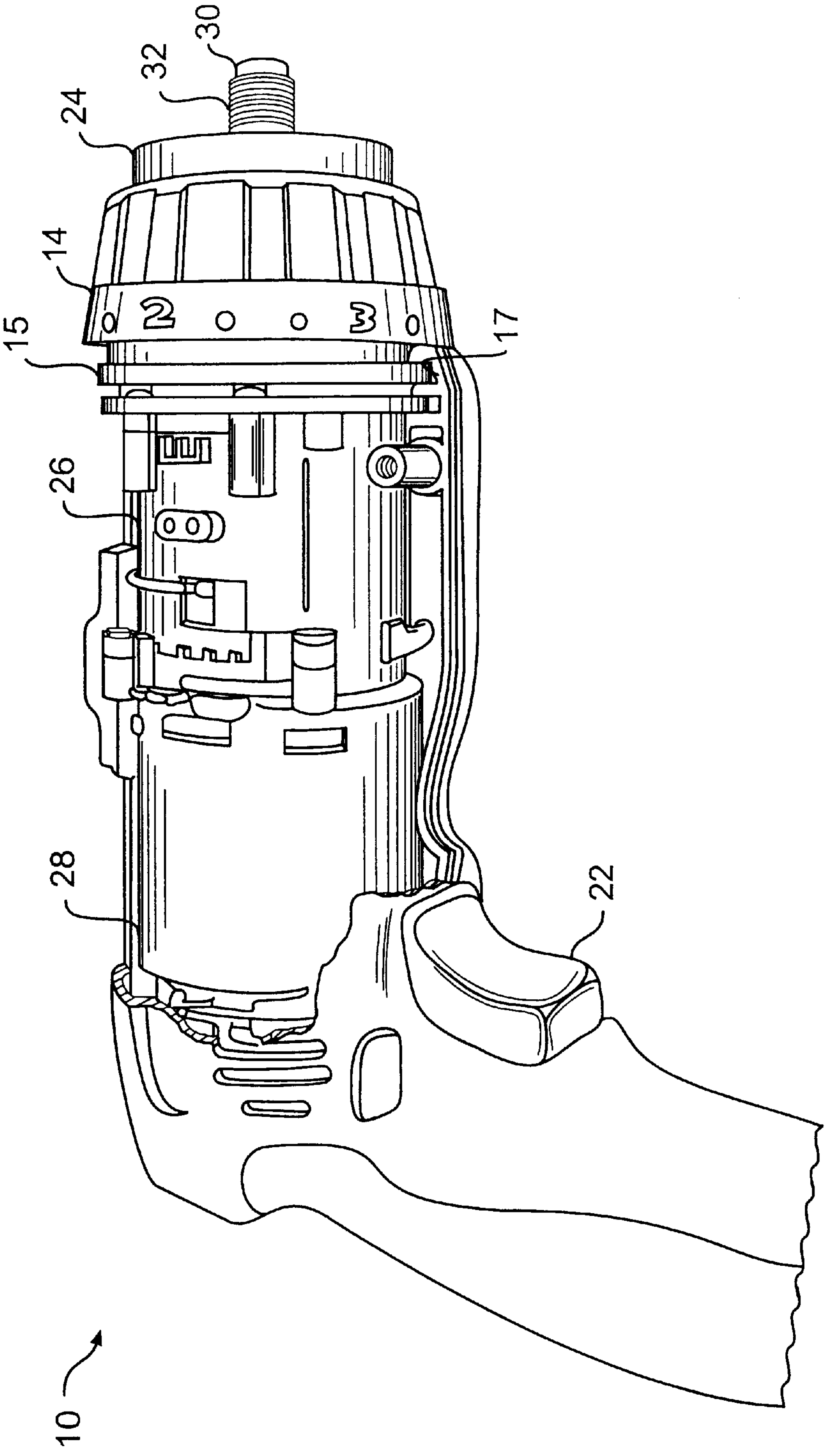
FIG. 2 is a partial perspective view, partly in section, of the power driver of FIG. 1.
Figure 3:
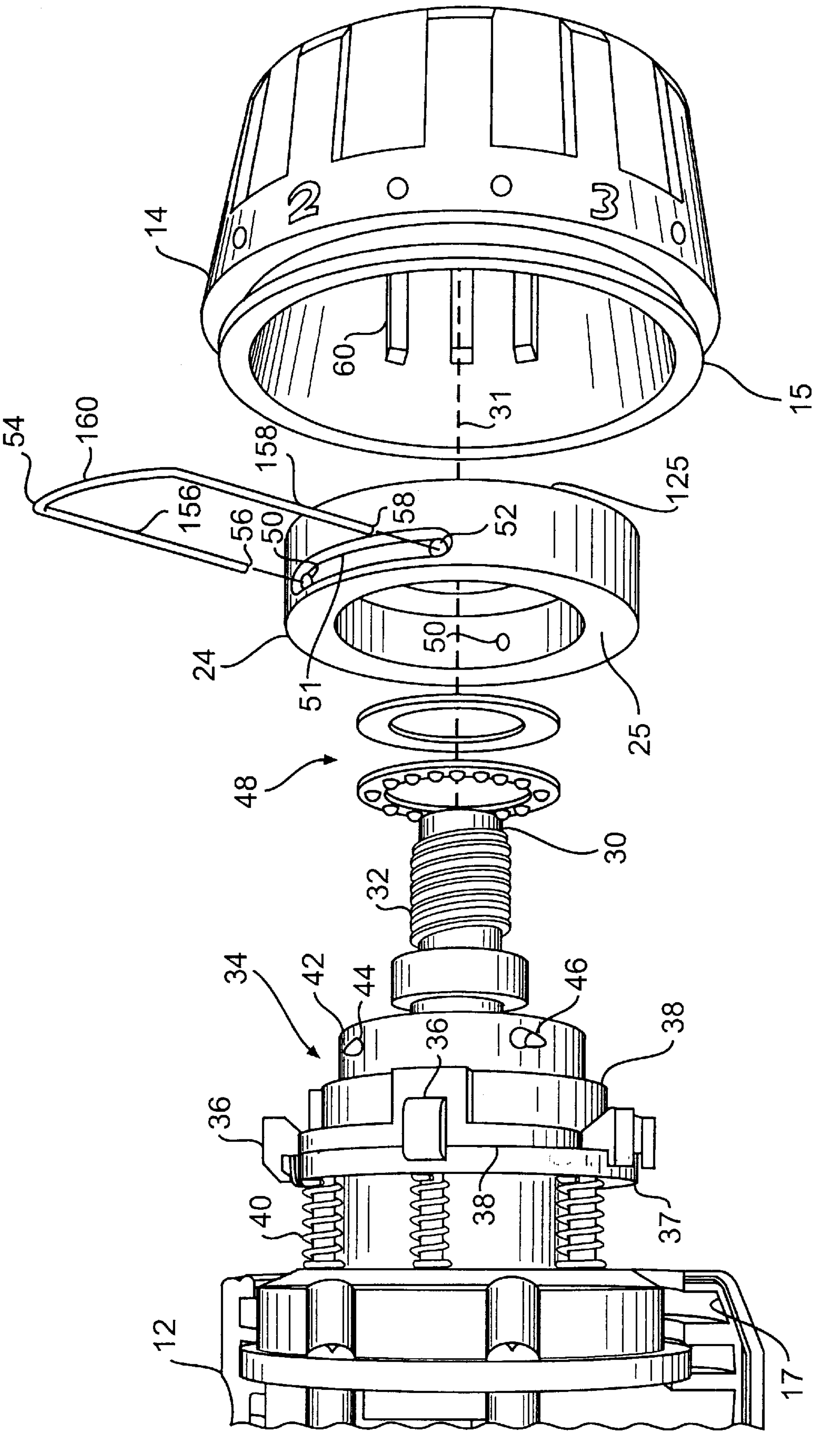
FIG. 3 is a partial exploded perspective view of the power driver of FIG. 1.
Figure 7:
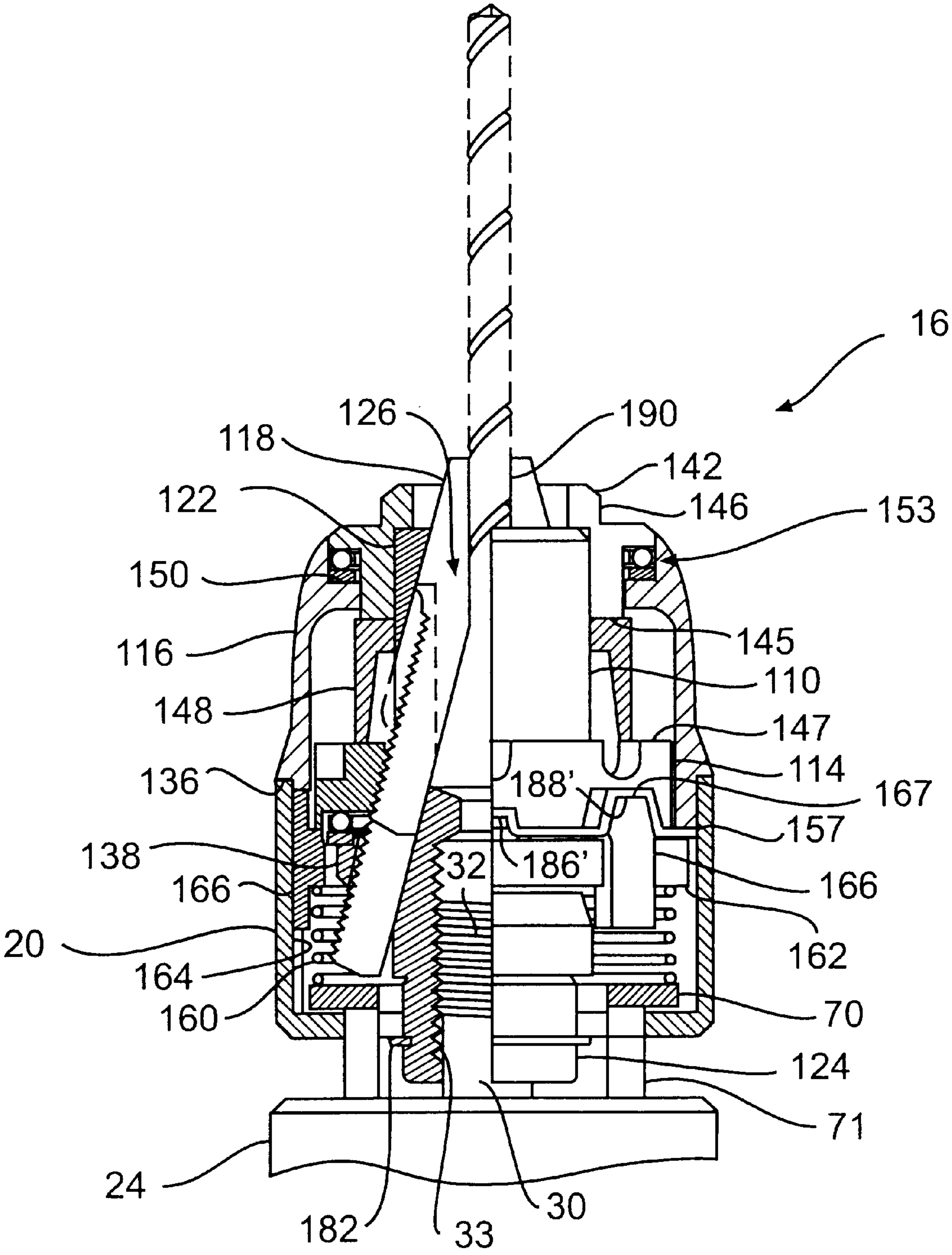
FIG. 7 is a plan view of a drill chuck in accordance with an embodiment of the present invention.

Referring now to FIG. 2, power driver 10 includes a gearbox assembly 26 disposed within drill housing 12 between a drill motor 28 and clutch ring 14. Clutch ring 14 includes a lip 15 at its rearward end that is received within a groove 17 defined in housing 12 (FIG. 3). When housing 12 is assembled, clutch plate 14 is held by groove 17 against movement in the axially forward direction with respect to housing 12. A drill spindle 30 extends axially through interface plate 24 and includes threads 32 that mate with threads 33 defined in a chuck body 110 (FIG. 7).

Referring now to FIG. 3, a forward end or front portion 34 of gearbox 26 includes a clutch receiving ring 38 having a series of radially outward extending lugs 36 defined thereon. Ring 38 is disposed about a drill axis 31 adjacent to an annular plate 37. In one preferred embodiment, ring 38 is threaded onto a front portion 34 of gearbox 26 so that it is axially reciprocal with respect to the driver housing upon rotation. Receiving ring 38 is rotatable with respect to annular plate 37. Together, plate 37 and ring 38 are biased away from the driver housing by springs 40. Rotation of ring 38 on gearbox front portion 34 moves plate 37 axially with respect to gear box 26 to adjust a clutch mechanism (not shown).

Figure 4:
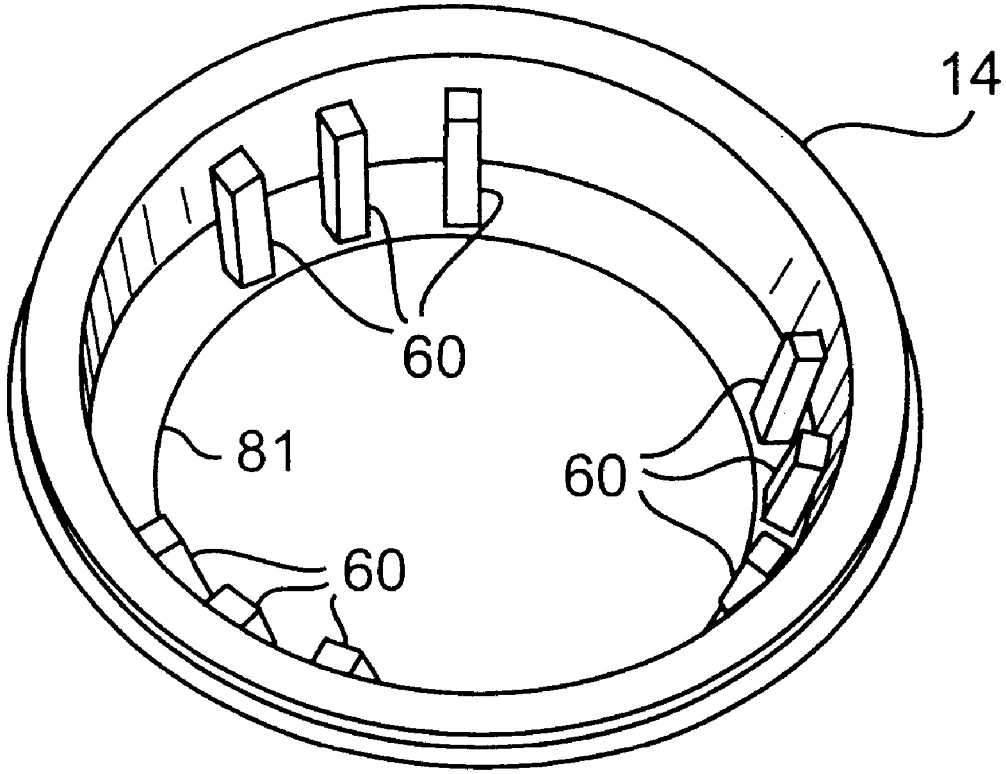
FIG. 4 is a perspective view of a clutch ring in accordance with an embodiment of the present invention.

Referring also to FIG. 4, clutch ring 14 includes a series of drive dogs 60 on an inner circumferential surface thereof. Drive dogs 60 engage lugs 36 so that clutch ring 14 is rotationally held to receiving ring 38 and fits onto ring 38 in only one rotational position. In the preferred embodiment shown in FIG. 4, nine drive dogs 60 are employed, including three sets of three dogs that are non-symmetrically disposed about the inner circumference of clutch ring 14 correspondingly to legs 36. Rotation of clutch ring 14, and therefore axial movement of ring 38 and plate 37, controls torque applied to spindle 30 by gearing within the gearbox. Gear arrangements in power drivers to control speed and torque are known and should be understood in this art. Such gearing does not, in and of itself, form a part of the present invention, and is therefore not discussed in detail herein.

Forward end 34 of gearbox 26 includes a receiving plate 42 that may be formed integrally with drill housing front portion 34 or as a separate component. Receiving plate 42 includes a pair of generally parallel chordal apertures 44 and 46 defined therethrough. In the illustrated embodiment, apertures 44 and 46 are offset from axis 31 within a common plane perpendicular to axis 31. A bearing assembly 48 is disposed about drill spindle 30 axially forward of receiving plate 42.

Interface plate 24 is generally annular and defines a front face 125 and a rearward face 25. Apertures 50 and 52 extend through plate 24 correspondingly to apertures 44 and 46 in the receiving plate (the bottom half of aperture 52 is not shown in FIG. 3). The outer surface of interface plate 24 defines a groove 51 between faces 25 and 125 that surrounds apertures 50 and 52.

Referring again to FIG. 3, a generally U-shaped pin 54 has a first section 156 that extends through apertures 50 and 44 and a second section 158 that extends through apertures 52 and 46. A middle pin portion 160 extends between sections 156 and 158 and is received in groove 51. Pin 54 axially and rotationally couples the plates 24 and 42 to each other.

Figure 5:
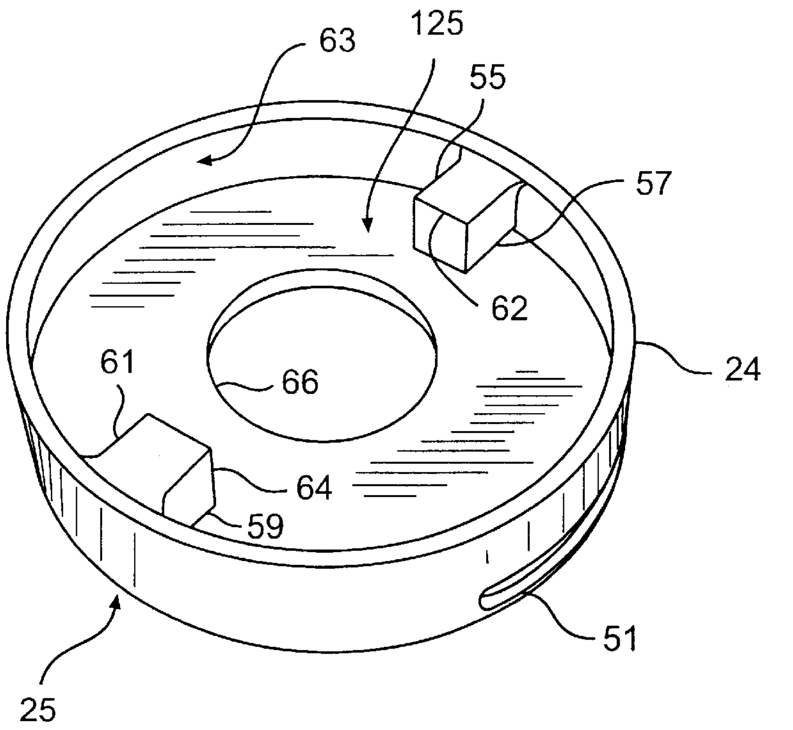
FIG. 5 is a perspective view of an interface plate in accordance with an embodiment of the present invention.

Referring to FIG. 5, an interface plate 24 in accordance with an embodiment of the present invention includes a pair of opposing stops 62 and 64 extending forward from face 125. Stops 62 and 64 are defined between an annular flange 63 and a center hole 66. Stop 62 defines a clockwise side surface 57 and a counterclockwise side surface 55, and stop 64 defines a clockwise side surface 61 and a counterclockwise side surface 59.

Figure 6:
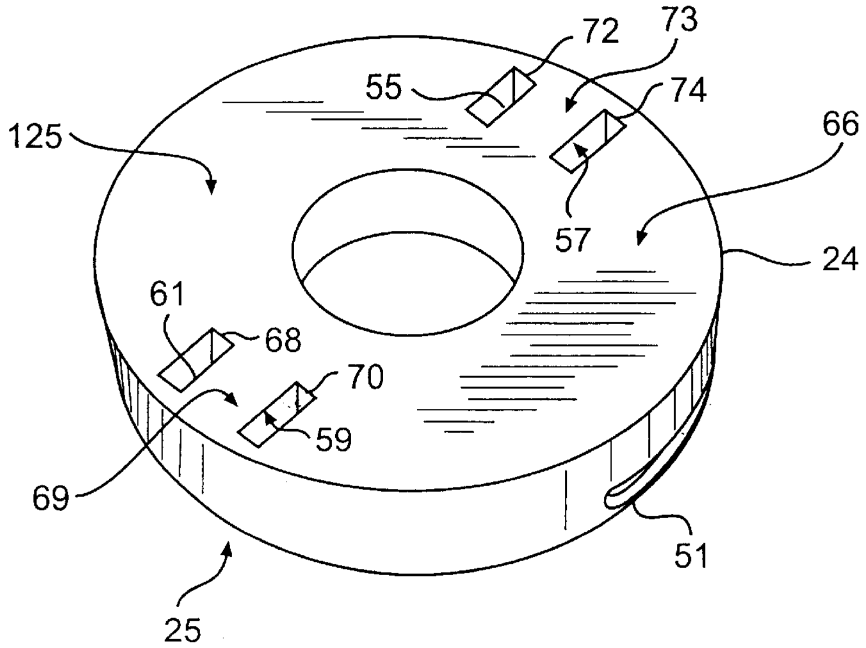
FIG. 6 is a perspective view of the interface plate shown in FIG. 3.

FIG. 6 illustrates another embodiment of interface place 24. The interface plate includes groove 51, forward face 125, and four leg receiving apertures 68, 70, 72, and 74 defined in forward face 125. In this embodiment, front face portions 69 and 73 defined respectively between apertures 68 and 70 and between apertures 72 and 74 act as stops. Side surfaces 55, 57, 59, and 61 are defined within apertures 72, 74, 70, and 68, respectively, adjacent to front face stop portions 69 and 73.

Figure 8:
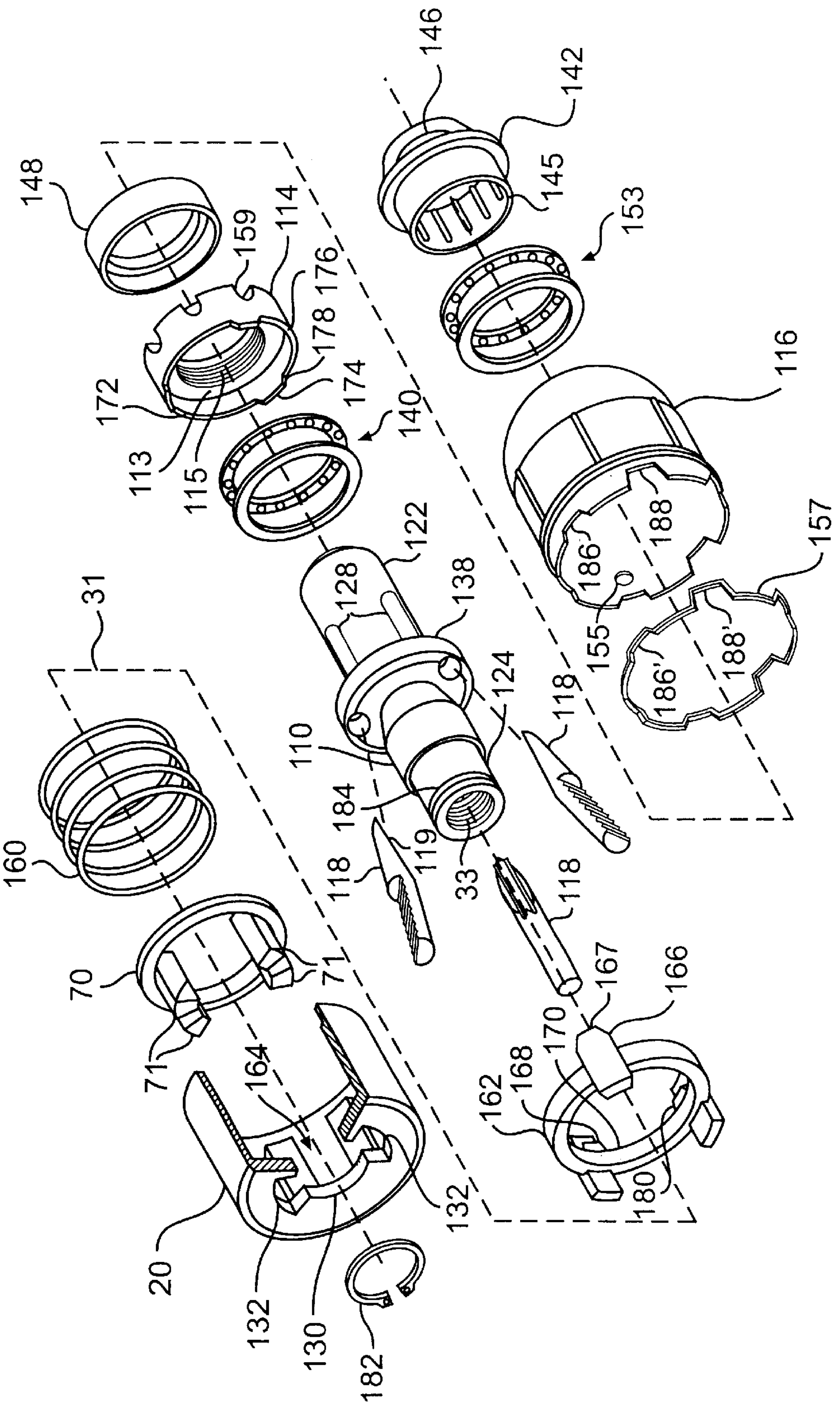
FIG. 8 is an exploded view of the chuck of FIG. 7.

Referring now to FIGS. 7 and 8, chuck 16 includes an annular ring 70 having four axially rearwardly extending legs 71. In the assembled chuck, and referring also to FIG. 5, one leg sits on each side of stops 62 and 64 so that the legs add rotationally fix ring 70 with respect to interface plate 24. It should be understood that the shape and configuration of legs 71 and/or plate 24 may vary. For example, and referring also to FIG. 6, legs 71 may extend into respective holes 68, 70, 72, and 74 to hold ring 70 rotationally with respect to interface plate 24.

Chuck 16 includes a body 110, a nut 114, a front sleeve 116, a plurality of jaws 118, and rear sleeve 20. Rear sleeve 20 defines a pair of cut-outs 132 on opposite sides of a center aperture 130. Ring legs 71 extend rearwardly through cut-outs 132 so that the legs are rotationally fixed to, but may move axially with respect to, rear sleeve 20. It should be understood that various chuck configurations may be employed within the present invention and that other suitable mechanisms may be employed to mount annular ring 70 to the chuck.

Body 110 includes a nose or forward section 122 and a tail or rearward section 124. Body tail section 124 defines an annular groove 184 for receipt of a snap ring 182 that holds rear sleeve 20 against movement in the axially rearward direction with respect to chuck body 110. An axial bore 126 is defined in body nose section 122 and includes a plurality of passageways 128 that slidably receive jaws 118. Passageways 128 are angled with respect to chuck axis 31 and intersect at a common point within or slightly forward of axial bore 126. Body 110 defines a thrust bearing ring 138 through which a portion of passageways 128 pass. A bearing assembly 140 is disposed between thrust bearing ring 138 and an axially rearward facing surface 113 of nut 114.

Each jaw 118 defines a tool engaging face 119 and threads 121 on opposing surfaces thereof. Nut 114 is generally cylindrical and includes threads 115 defined on an inner circumferential surface thereof that engage the jaw threads to drive the jaws within their respective passageways 128. Preferably, three jaws are employed, and each jaw is separated from its adjacent jaw by an arc of approximately 120 degrees.

Body nose section 122 receives a nose piece 142 that is press fit thereon. Nose piece 142 may be attached to body 12 by any suitable method, for example threading, crimping, staking, or the like. The nose piece includes a pair of opposing flat surfaces 146 that may be used to hold the chuck body while. rotating the chuck nut to open or close the chuck jaws.

Front sleeve 116 includes an annular ledge 150 at its axially forward end that receives a bearing assembly 153 disposed between nose piece 142 and sleeve 116. Thus, front sleeve 116 is rotatable with respect to nose piece 142 and body 110. Front sleeve 116 holds rear sleeve 20 against movement in the forward axial direction with respect to the body via engagement at a front sleeve ledge 136. Nose piece 142 also holds nut 114 against movement in the forward axial direction with respect to body 110 by engagement between a rearward axial face 145 defined on the nose piece and a generally cylindrical retainer member 148. Retainer member 148, in turn, presses against a forward axial face 147 of nut 114. Thus, nut 114 is axially held to, but is rotatable with respect to, the chuck body. It should be understood that the forward portion, including forward face 147, of nut 114 could extend to contact nose piece rearward axial face 45 directly, thus eliminating the need for retainer member 148.

A thrust ring 162 is disposed about chuck body 110 radially within rear sleeve 20 and axially rearward of chuck nut 114. A coil spring 160 disposed between ring 70 and thrust ring 162 biases thrust ring 162 axially forward toward nut 114. Thrust ring 162 defines three splines 166 on its outer circumference that are received within slots or channels 164 defined on an inner circumferential surface of rear sleeve 20 so that thrust ring 162 is rotationally fixed to, but axially movable with respect to, rear sleeve 20. Each thrust ring spline 166 defines an axially forward end 167.

Thrust ring 162 includes a front face 170 disposed radially inward of splines 166. A plurality of teeth 168 extend forward from front face 170. Front sleeve 116 includes a plurality of alternating shallow and deep recesses 186 and 188 defined on an axially rearward facing surface of the front sleeve. A wear resistant ring 157 may be provided between front sleeve 116 and thrust ring 162 that defines recesses 186' and 188' corresponding to the sleeve recesses 186 and 188, respectively.

Nut 114 includes teeth 174 extending rearwardly from an axially rearward facing nut surface 176. Gaps between the teeth are indicated at 172. Nut teeth 174 define sloped side surfaces 178. In the embodiments illustrated in the drawings, three thrust ring splines 166, three nut teeth 174, and three thrust ring teeth 168 are employed.

In an impact mode, wherein sleeve 116 is rotated so that forward ends 167 of splines 166 are received by deep recesses 188, spring 160 biases the thrust ring forward so that thrust ring teeth 168 are received within nut gaps 172. When an operator drives the motor so that body 110 rotates about chuck axis 31, frictional forces cause body 110, jaws 118, and nut 114 to rotate together until sloped surfaces 178 on nut teeth 174 abut sloped surfaces 180 on thrust ring teeth 168. Since thrust ring 162 is rotationally held to rear sleeve 20, the thrust ring stops the nut's rotation, and further rotation of body 110 causes relative rotation between the body and the nut to advance or retract the jaws in passageways 128. Accordingly, the chuck can be opened or closed through actuation of the drill without gripping the chuck.

When the chuck reaches a fully closed position, such that the jaws have closed onto a tool shank 190 (FIG. 7) and are no longer able to move axially within passageways 128, the nut threads wedge with the jaw threads. When the rotational force between thrust ring 162 and nut 114 overcomes the biasing force applied by spring 160, the sloped teeth surfaces 178 and 180 enable the thrust ring teeth to slide axially rearward and around nut teeth 174 into the adjacent gaps 172. The chuck body continues to rotate until thrust ring teeth sloped surfaces 180 engage the next set of nut teeth sloped surfaces 178. If the operator continues to actuate the drill motor, the rotational force will again overcome the axial force of spring 160, and teeth 174 and 168 will again ride over each other. This provides a repeating impact that further tightens the nut onto the jaws and produces a sound to notify the operator that the chuck is in the fully closed position.

It should be understood that the angle formed between sloped side surfaces 178 and 180 and a plane coinciding with chuck axis 31 may vary and that such variance will affect the force imparted between the thrust ring and the nut. For example, if the above described angle is small, a greater force is required between thrust ring 162 and nut 114 to move the thrust ring axially rearward against spring 160 than would be required if the angle were larger.

In a normal operating mode, the front sleeve is rotated with respect to rear sleeve 20 so that thrust ring splines 166 (and forward ends 167) engage shallow recesses 186. In this configuration, thrust ring teeth 168 are held axially out of engagement with nut teeth 174. Thus, when an operator drives the drill to rotate the chuck body, nut 114 rotates with body 110 without impacting thrust ring 162.

Front sleeve 116 defines a radial bore 155 therethrough, and a series of notches 159 are defined in an axially forward face of nut 114. Bore 155 enables an operator to insert an elongated pin through the front sleeve and into a notch 159 to hold nut 114 and rotate it manually with respect to chuck body 110, for example by gripping flats 146 on nose piece 142 with pliers, a wrench, or the like, while rotationally holding nut 114 with the pin.

The outer circumferential surfaces of sleeves 116 and 20 may be knurled or may be provided with longitudinal ribs or other protrusions to enable the operator to grip them securely. The sleeves may be fabricated from a structural plastic such as polycarbonate, a filled polypropylene, for example glass filled polypropylene, or a blend of structural plastic materials. Other composite materials such as, for example, graphite filled polymerics could also be suitable in certain environments. Further, the sleeves may be constructed from suitable metals, such as steel.

As should be appreciated by one skilled in the art, the materials from which the chuck is fabricated will depend on the end use of the power driver, and the above are provided by way of example only. Additionally, it should be understood that various chuck arrangements may be used in conjunction with the present invention and that the particular embodiments illustrated in the figures are provided by way of example only and are not intended to limit the present invention.

To assemble drill chuck 16 onto drill 10, interface plate 24 is first fastened to receiving plate 42 via pin 54, and chuck 16 is then oriented so that legs 71 are disposed on each side of stop blocks 62 and 64 (FIG. 5) of interface plate 24, or in respective holes 68, 70, 72, and 74 (FIG. 6), depending on the plate. Thus, ring 70 is rotationally held with respect to interface plate 24. Next, the body is secured to the spindle via threads 33 and 32 so that chuck 16 is drawn rearwardly onto spindle 32. Spring 160 enables ring 70 to move axially with respect to chuck body 110 and rear sleeve 20 as the chuck moves onto the spindle. Since interface plate 24 is rotationally held to housing 12 via pin 54 as set forth above, rear sleeve 20 is now rotationally held to drill 10 by interaction between legs 71 and cut-outs 132.

While one or more preferred embodiments have been described above, it should be understood that any and all equivalent realizations of the present invention are included within the scope and spirit thereof. The embodiments depicted are presented by way of example only and are not intended as limitations on the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A chuck assembly for use with a power driver having a forward end, a housing, a gear box, and a rotatable spindle driven by the gear box and extending from the forward end, said chuck assembly comprising:

an interface plate separate from said housing and said gear box, said plate received by said forward end and rotationally fixed to said forward end, said interface plate having a forward face defining a center opening through which the spindle extends, and a forward-facing rotational stop, and said interface plate including a generally cylindrical flange extending axially rearward from said forward face and wherein said forward end is received within said flange; and a chuck having a generally cylindrical body having a nose section and a tail section, said tail section being configured to rotate with the spindle and said nose section having an axial bore formed therein, a plurality of jaws received by said body and movable therein toward and away from the axis of said axial bore, and a bracket disposed about said body and extending rearwardly of said tail section, said bracket defining a rearward surface engaging said stop continuously during operation of said chuck so that said bracket and said interface plate are rotationally fixed to each other.

2. The chuck assembly as in claim 1, wherein said interface plate defines a plurality of said stops.

3. The chuck assembly as in claim 1, wherein said stop includes a pair of side surfaces facing in opposite tangential directions with respect to said axis, and wherein said bracket engages each of said side surfaces.

4. The chuck assembly as in claim 3, wherein said stop includes a lug extending axially forward from said forward face and wherein said side surfaces are defined on opposite sides of said lug.

5. The chuck assembly as in claim 4, wherein said bracket includes a pair generally parallel legs disposed on opposite sides of said lug and engaging respective said side surfaces.

6. The chuck assembly as in claim 5, including two said lugs disposed opposite each other across said center opening and wherein said bracket includes two said pair of legs respectively engaging said lugs.

7. The chuck assembly as in claim 3, wherein said forward face defines an axially aligned aperture therein and wherein said side surfaces are defined on opposite sides of said aperture.

8. The chuck assembly as in claim 7, wherein said bracket includes a leg received by said aperture and engaging said side surfaces.

9. The chuck assembly as in claim 8, wherein said forward face defines two pair of adjacent said apertures, said pairs being opposite each other across said center opening, and wherein said bracket includes two pair of generally parallel said legs, each said pair of legs received by a respective pair of said apertures.

10. The chuck assembly as in claim 1, wherein said chuck includes a rear sleeve disposed rotatably about said tail section of said body, and wherein said bracket is rotationally fixed to said rear sleeve.

11. The chuck assembly as in claim 10, wherein said rear sleeve defines a rear face with one or more apertures extending therethrough and wherein said bracket is disposed within said rear sleeve and extends through said at least one of said one or more apertures so that said bracket is rotationally coupled to said rear sleeve at said at least one aperture.

12. The chuck assembly as in claim 1, wherein said forward face extends radially inward from said flange.

13. The chuck assembly as in claim 1, wherein said interface plate and said forward end define generally parallel chordal apertures passing therethrough, and including a generally U-shaped pin extending through said parallel apertures so that said interface plate is rotationally and axially fixed to said forward end.

14. A chuck assembly for use with a power driver having a forward end, a housing, a gear box, and a rotatable spindle driven by the gear box and extending from the forward end, said chuck assembly comprising:

an interface plate separate from said housing and said gear box, said interface plate received by and rotationally fixed to said forward end, said interface plate having a forward face defining a center opening through which the spindle extends, and a plurality of forward-facing rotational stops, each said stop including a pair of side surfaces facing in opposite tangential directions with respect to said axis, and said interface plate including a generally cylindrical flange extending axially rearward from said forward face and wherein said front end is received within said flange; and a chuck having a chuck body having a nose section and a tail section, said tail section being configured to mate and rotate with the spindle and said nose section having an axial bore formed therein, a plurality of chuck jaws received within said axial bore and movable therein toward and away from the chuck axis, a rear sleeve disposed rotatably about said tail section of said body, said rear sleeve including a rear face defining a plurality of apertures extending therethrough, and a bracket disposed about said tail section and rotationally fixed to said rear sleeve, said bracket extending rearwardly of said chuck body and defining a rearward surface engaging at least one of said stop side surfaces continuously during operation of said chuck and holding said bracket rotationally with respect to said interface plate.

15. The chuck assembly as in claim 14, wherein said forward face extends radially inward from said flange.

16. The chuck assembly as in claim 15, including means for holding said interface plate axially and rotationally to said forward end, wherein at least one of said plurality of forward-facing interface plate rotational stops includes a lug extending axially forward from said forward face.

17. The chuck assembly as in claim 14, wherein said rear sleeve rear face includes a radially inward extending annular lip adjacent to said body tail section, wherein said bracket includes an annular forward portion that is disposed entirely radially within said rear sleeve, and wherein said bracket rearward surface extends through at least one of said rear sleeve apertures so that said bracket is rotationally coupled to said rear sleeve.

18. The chuck assembly as in claim 14, wherein said chuck includes an annular nut in operative communication with said chuck jaws to drive said jaws toward and away from the chuck axis, and a thrust ring axially reciprocally disposed about said body tail section and rotationally fixed to said rear sleeve, said thrust ring including means for rotationally holding said nut with respect to said rear sleeve.

19. The chuck assembly as in claim 18, wherein said chuck includes a spring disposed between said rear sleeve and said thrust ring to bias said thrust ring toward said chuck nut, and means for disengaging said rotational holding means so that said chuck nut rotates freely with respect to said rear sleeve.

20. The chuck assembly as in claim 19, wherein said disengaging means includes a front sleeve disposed about said nose section, said front sleeve including an annular axially rearward facing portion defining a plurality of deep recesses, wherein each said deep recess is separated from an adjacent pair of said deep recesses by at least one shallow recess, said front sleeve in engagement with said thrust ring and in communication with said spring so that when said thrust ring is received in said front sleeve shallow recesses, said thrust ring is moved axially rearward with respect to said chuck body and said rear sleeve to disengage said rotational holding means so that said chuck nut can rotate freely with respect to said rear sleeve.

* * * * *

UNITED STATES PATENT AND TRADEMARK OFFICE

CERTIFICATE OF CORRECTION

PATENT NO. : 6,488,286 B2 
DATED : December 3, 2002
INVENTOR(S) : Theodore G. Yaksich It is certified that error appears in the above-identified patent and that said Letters Patent is hereby corrected as shown below:

Column 4,
Line 35, before the word "rotationally" please delete the word "add".

Column 7,
Line 54, before the word "surfaces" please delete the word "side" and replace with -- said --.

Signed and Sealed this

Twenty-first Day of June, 2005

JON W. DUDAS
*Director of the United States Patent and Trademark Office*

UNITED STATES PATENT AND TRADEMARK OFFICE

CERTIFICATE OF CORRECTION

PATENT NO. : 6,488,286 B2
APPLICATION NO. : 09/841952
DATED : December 3, 2002
INVENTOR(S) : Theodore G. Yaksich It is certified that error appears in the above-identified patent and that said Letters Patent is hereby corrected as shown below:

<u>Column 7,</u>
Line 54, before the word "surfaces" the word "side" (as deleted by Certificate of Correction issued June 21, 2005) should be reinstated.

Signed and Sealed this

Twelfth Day of September, 2006

JON W. DUDAS
*Director of the United States Patent and Trademark Office*